April 8, 1969 F. DIAZ 3,437,510
MAGNETIC TAPE BINDER
Filed Nov. 7, 1963
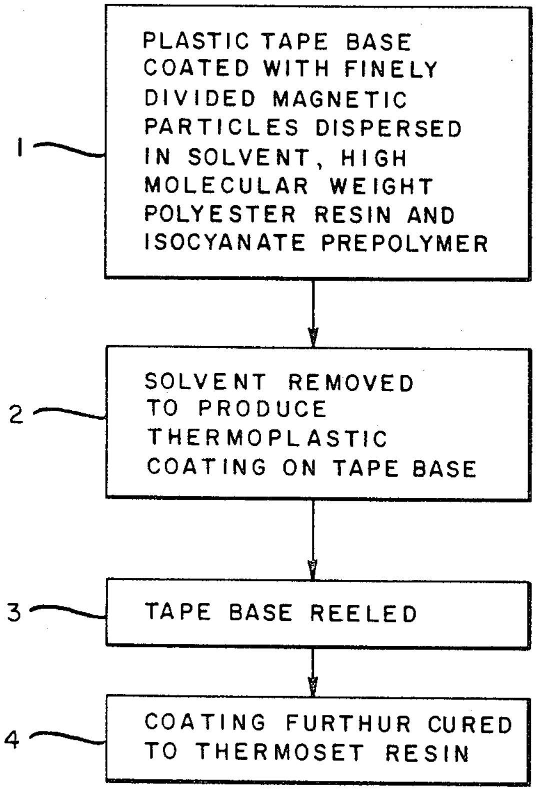
INVENTOR.
FRANK DIAZ
BY [signature]
ATTORNEY United States Patent Office 3,437,510
Patented Apr. 8, 1969

3,437,510
MAGNETIC TAPE BINDER

Frank Diaz, Los Altos, Calif., assignor to Ampex Corporation, Redwood City, Calif., a corporation of California Filed Nov. 7, 1963, Ser. No. 322,075
Int. Cl. B44d *1/44*
U.S. Cl. 117—62 6 Claims This invention relates to magnetic recording media wherein a sheet or tape of a plastic material has a coating applied thereto, which coating comprises finely divided magnetic particles dispersed in a binder. The invention particularly relates to a thermoset binder for such media having extremely long wear characteristics.

Modern tape recorders and reproducers, particularly those of the rotating head type as are used in video recording, impose severe heat and abrasion stresses on magnetic tape, so that the useful life of the tape is limited. Tape wear is a complex process. It involves many factors such as erosion of oxide coating, whether or not the worn particles adhere to each other and/or to the recording heads and whether or not transfer of worn (eroded) material occurs from the recording head back to the magnetic tape surface (re-deposits). Tape failure can occur from any or all of these conditions. In addition, abrasive properties of the coating must be minimized so as to have a reasonable head life for the expensive video heads.

The most desirable form of wear is that of a slow "sloughing off" of oxide coating. The eroded material should be a very fine powder which is efficiently sucked away by the vacuum. This way there is only a very gradual loss of recorded signal, with no catastrophic complete loss of signal at an unpredictable point in tape use. The present invention provides such a coating.

Short tape life is largely the result of thermoplasticity, which has characterized most tapes heretofore known. Although tapes have been proposed having thermoset binders, the thermoset binders are ordinarily difficult to manufacture, since they require a long curing time at an elevated temperature. Thus, such thermosetting tapes as have heretofore been known can only be produced at low production rates, since they cannot be reeled until the binder has substantially cured.

In accordance with the present invention, these defects are obviated by combining a high molecular weight polyester resin with a polyurethane prepolymer. In the past, it has been proposed to combine the polyurethanes and polyesters as tape binders, but low molecular weight ester monomers have been used as a starting material, so that a long reaction time between the components is required, resulting in the slow production rate mentioned above.

It is therefore an object of the present invention to provide a long life binder for magnetic tapes.

Another object of this invention is to provide a binder for magnetic tapes which causes little smearing or wear of recording or reproducing heads.

Still another object of this invention is to provide a thermosetting binder for magnetic tapes which can be reeled almost as soon as the tape is coated, with the final curing taking place after the tape is on a reel.

Other objects of the invention will be apparent from the specification which follows.

In carrying out the present invention, a high molecular weight polyester having reactive hydroxyl groups is combined with a low molecular weight isocyanate prepolymer. By the term high molecular weight polyester resin is meant the polymerized reaction product of a dibasic acid with a dihydroxy alcohol, the polymerized product having a molecular weight of at least 10,000.

The sole figure of the drawing is a block diagram of the flow sheet of the process of the present invention.

In the drawing 1 represents the plastic tape base which has been coated with finely divided magnetic particles dispersed in solvent, high molecular weight polyester resin and isocyanate prepolymer. At 2 the solvent has been removed to produce a thermoplastic coating on the tape base. At 3 the tape base with the thermoplastic coating thereon has been reeled. At 4, the coating is further cured while in the reeled condition to produce a thermoset resin.

A typical suitable polyester is sold under the trade name Vitel PE–207 by the Goodyear Chemical Company. This polyester resin is described as being a linear saturated thermo-plastic polyester resin of isophthalic acid and butane diol, with excellent solubility properties. This resin is very flexible, tough and rubbery, with outstanding adhesive characteristics. The physical properties of Vitel PE–207 are as follows:

| | |
|---|---|
| Color | Light straw colored. |
| Odor | Odorless. |
| Intrinsic viscosity | 0.775+0.03. |
| Specific gravity | 1.215. |
| Melting range | 200–285° F. |
| Thermal stability | Excellent. |
| Moisture absorption | 0.4% at 100° F. at 100% R.H. |
| Hydroxyl number | 2.5–3.0. |

Other polyester resins of this series such as Vitel PE–100, PE–101, and PE–200 are also suitable.

Various diisocyanate prepolymers can be used, such as the adducts of toluene diisocyanate or diphenyl methane diisocyanate with polyhydroxy alcohols. Such adducts are not polymerized to any great extent and have molecular weights from about 1100 to 5000. One particularly suitable prepolymer is sold under the name of DV–1088 by Spencer Kellogg and Sons and is described by them as being a diphenyl methane diisocyanate polyurethane prepolymer capable of being cured by means of a catalyst, heat or pressure or a combination of all three. It can also be further reacted with polyhydroxy-containing materials. In the examples DV 1088–50 is used, the 50 designated a 50% by weight solution in toluene. Typical analysis of DV–1088 is:

| | |
|---|---|
| NCO | 4.5%. |
| Viscosity | A (Gardner-Holdt). |
| Nonvolatile | 50.0%. |
| Specific gravity of solution | 0.985. |
| Specific gravity of solids | 1.01. |
| Solvent | Toluene. |
| Appearance | Opaque liquid resin. |

Other suitable prepolymers are the toluene diisocyanate reaction products with polyols sold under the trade names of Mondur CB75 and Mondur CB60.

In order to carry out the invention, it is only necessary to mix a solution of the high molecular weight polyester with a solution of the polyurethane prepolymer wherein one or the other of the components contains the desired finely divided magnetic particles. Ordinarily, quite dilute solutions are prepared utilizing solvents which are well known to those skilled in the art. One particular solvent system which has been found effective comprises 20% by weight methyl isobutyl ketone, 46% methyl ethyl ketone, and 34% toluene. Hereafter when the term "solvent" is used, this mixture of solvents was employed. The ratio of the polyester to the isocyanate can be varied over rather wide limits. Satisfactory tapes in accordance with the present invention can be made with from 25% to 75% of the polyester with the balance of the binder composition on a resin-solids basis by weight being the polyurethane prepolymer. The magnetic particles are ordinarily acicular gamma ferric oxide although other magnetic pigments can be used. The coating ordinarily contains, on a resin solids basis, from about 65% to 85% by weight of the magnetic material.

The magnetic pigment can be added to either of the binder components. Good tapes have been made by both methods. However, if the pigment is dispersed in the polyurethane prepolymer, it is necessary that the magnetic oxide powder, solvents, and other ingredients be throughly dried prior to mixing them together, since moisture acts as a catalyst for inducing polymerization of the isocyanate prepolymer, and extensive moisture can lead to gelation while the oxide is being dispersed in the prepolymer. Therefore, it is preferred to disperse the oxide in the polyester portion of the binder. The polyester portion of the binder is not chemically sensitive to the normal moisture found on oxide pigments or solvents, so that fewer precautions need be used when incorporating the magnetic oxide in the polyester portion. Thus, one can disperse the pigment within the polyester, utilizing a ball mill, and after the pigment is thoroughly dispersed, the isocyanate prepolymer is added thereto and mixed. If desired, a catalyst can be incorporated into the mixture to accelerate curing. Amine catalysts are suitable for curing of the prepolymer, and can be used in the amounts of 0.5–4.0% based on prepolymer solids. Higher amounts of catalyst produce faster curing films, but the higher catalyst level decreases the pot life of the prepolymer. Varying the catalyst level has very little effect on the final film.

Various other materials can be used in the coating, such as dispersing agents, lubricants and anti-static agents. Lecithin, silicone oil and reticulated carbon black, respectively, are typical of such materials.

After mixing, the mixture can be coated on a film or other support utilizing normal film coating techniques, such as a gravure coater or a knife edge coater. Although Mylar (a polyester resin) is preferred as the tape base, other bases such as cellulose acetate or polypropylene can be employed. Such bases are well known to those skilled in the art and are referred to in the claims as organic plastic tape bases. Normally, the time available for coating is up to several hours after preparing the mixture of the prepolymer and the polyester.

After the tape is coated, it is passed through an oven to remove the solvents, but it is not necessary to leave the tape in the oven long enough to cure the resin. Thus, the freshly coated tape can be immediately reeled as soon as it is removed from the oven, and the final cure will take place while the tape is on the reel. Storing the reels at 140° F. to 150° F. for 48 hours or at room temperature for about a week is sufficient to thoroughly cure the coating.

The following non-limiting examples are preferred methods of carrying out the present invention.

EXAMPLE I

A mixture was made containing the following:

| | Parts by weight |
|---|---|
| Gamma ferric oxide | 1620.0 |
| Soybean lecithin | 81.0 |
| Silicone fluid | 16.2 |
| Toluene | 374.0 |
| Methyl ethyl ketone | 506.0 |
| Methyl isobutyl ketone | 220.0 |

The above ingredients were ground in a ball mill for 72 hours. The following resin solution was then added:

| | Parts by weight |
|---|---|
| Vitel PE–207 | 213.0 |
| Toluene | 212.0 |
| Methyl ethyl ketone | 286.0 |
| Methyl isobutyl ketone | 124.0 |

Grinding was continued for an additional 24 hours. The magnetic oxide dispersion was discharged into a vessel equipped with an efficient agitator. With agitation, the following solution was slowly added:

| | Parts by weight |
|---|---|
| DV1088–50 (50% adduct in toluene) | 309.0 |

This was mixed well for 30 minutes, filtered and coated on a polyester (Mylar) film base.

The wet coating was dried in a 3-zone oven at 175° for the first zone and 225° F. for the second and third zone. The coating speed was 120 feet per minute. Total residence time in the oven was 35 to 40 secs. The coated polyester film was wound up on appropriate take-up reels as it left the oven. If the magnetic tape is unwound at this point, it does so without transferring coating to the adjacent layer or sticking together. This behavior occurs despite the fact that the crosslinking reaction has not occurred to any significant degree in the short time the tape was in the oven.

Final curing or crosslinking of the binder takes place by allowing the magnetic composition to stand at room temperature for about a week. A faster conversion to the cured state occurs if the doff of coated Mylar is placed in a 150° F. oven for 24 hours.

EXAMPLE II

In this example the composition was essentially the same as in Example I except that reticulated carbon black was added to render the tape electrically conductive and thus prevent the build up of static charges. The initial mixture of Example I was employed but the mixture is dispersed in the ball mill for only 36 hours. There was then added:

| | Parts |
|---|---|
| Conductive carbon black | 118 |
| Solvent | 150 |

Ball milling was continued for another 36 hours and the following resin solution was then added:

| | Parts |
|---|---|
| PE–207 | 213 |
| Solvent | 472 |

This was dispersed for 24 hours and 309 parts of DV1088 added and mixed as in Example I. Coating was then conducted as in Example I. Further examples follow:

| | III | IV | V | VI |
|---|---|---|---|---|
| Magnetic oxide | 1620.0 | 1620.0 | 1620.0 | 1620.0 |
| Soya lecithin | 81.0 | 81.0 | 81.0 | 81.0 |
| Silicone oil | 16.2 | 16.2 | 16.2 | 16.2 |
| Toluene | 374.0 | 374.0 | 374.0 | 374.0 |
| Methyl ethyl ketone | 506.0 | 506.0 | 506.0 | 506.0 |
| Methyl isobutyl ketone | 220.0 | 220.0 | 220.0 | 220.0 |

Disperse for 72 hours in pebble mill. Add the following resin solution.

| | III | IV | V | VI |
|---|---|---|---|---|
| PE-207 | 172.5 | 133.5 | 92.5 | 262 |
| Solvent | 628.0 | 587.0 | 550.0 | 550.0 |

Disperse the magnetic slurry with the resin solution for 24 hours in pebble mill. Discharge mill in mixing tank and add the following:

| | III | IV | V | VI |
|---|---|---|---|---|
| DV1088-50 | 376.0 | 440.0 | 508.0 | 508.0 |

This was mixed for about 30 minutes. The coating is formed as in Example I except that in Example IV a base of cellulose acetate rather than Myler was employed while in Example V a polypropylene base was employed.

The foregoing examples illustrate the preferred method in which the magnetic oxide is first treated by a slurry grind with surfactant, then dispersed initially in the polyester portion of the binder. The isocyanate portion is added to the system shortly before the coating and drying operation. In this manner, the effects of traces of water in causing gelation are minimized, and the charge can be coated before the mix is rendered useless by viscosity increase.

An alternative method of making a magnetic tape having this binder system is one where DV1088, the isocyanate containing prepolymer, is used to make the initial iron oxide dispersion. In this case, the polyester resin solution is added last, just prior to the coating operation. Examples with and without a surfactant-slurry grind are illustrative. It is also feasible to use a portion of the DV1088 in the initial slurry grind.

EXAMPLE VII

| | |
|---|---|
| Magnetic oxide | 900.0 |
| Silicone | 9.0 |
| Soya lecithin | 9.0 |
| DV1088–50 | 45.0 |
| Toluene | 420.0 |
| Methyl ethyl ketone | 130.0 |
| Methyl isobutyl ketone | 190.0 |

Slurry grind 54 hours with steel balls as grinding media. Then add:

| | |
|---|---|
| DV1088–50 | 214.0 |
| Toluene | 200.0 |

Continue grinding for 60 hours. Then add and mix well:

| | |
|---|---|
| PE–207 | 86.5 |
| Methyl ethyl ketone | 80.0 |
| Toluene | 80.0 |

Coat within 4 hours after adding PE–207 solution.

In this formulation, the level of lecithin is 1.0% of the oxide weight. Previous examples, with DV1088 being added last, show a lecithin level of 5.0% of the oxide weight. The decrease in lecithin results as DV1088 has moderately good oxide dispersing properties so that less surfactant is required to achieve proper dispersion.

In the use of the preceding technique, it is necessary that every precaution be taken to insure that moisture is eliminated from the composition being processed.

The oxide particles should be dried in an oven and all solvents should be the so-called "urethane" grade—with negligible moisture content. All processing equipment must be clean and dry.

If anything more than a trace of moisture enters the system during the dispersion process, a large increase in viscosity leading to ultimate gelation occurs. This phenomenon leads to the first method (DV1088 last) as being the preferred method, despite the rather poor surfactant properties of Vitel PE–207 (compared to DV-1088).

Another technique of dispersing pigments in isocyanate prepolymers is to first slurry grind the pigment with a small amount of toluene diisocyanate or diphenyl methane diisocyanate. This is done by tumbling the oxide with a diisocyanate-solvent mixture in a pebble mill. The diisocyanate reacts with any moisture present on the pigment surface or carried into the system with the solvents.

EXAMPLE VIII

| | Parts by weight |
|---|---|
| Magnetic iron oxide | 1000.0 |
| Toluene diisocyanate | 60.0 |
| Toluene | 500.0 |
| Methyl ethyl ketone | 100.0 |
| Methyl isobutyl ketone | 300.00 |

Slurry grind above materials for 24 hours with steel balls. Then add:

| | Parts by weight |
|---|---|
| DV1088 solution | 264.0 |
| Silicone oil | 5.0 |
| Toluene | 160.0 |

Continue mill grind for 48 hours—then add the following:

| | Parts by weight |
|---|---|
| PE–207 | 88.0 |
| Toluene | 100.0 |
| Methyl ethyl ketone | 20.0 |
| Methyl isobutyl ketone | 20.0 |

Mix by rotating mill for two hours—then discharge mill, filter mix and knife coat on Mylar film. The coating is dried in a 3 zone heated air drying oven at zone temperatures of 175° F., 225° F., and 225° F. Web speed is 120 feet/min. to give a 0.4 mil dried magnetic coating.

If a rapid cure at moderate temperatures is desired, specific catalysts are known which accelerate the OH+NCO reaction. One suitable catalyst that has been used in making magnetic tapes in accordance with the present invention is marketed by Spencer-Kellogg Company under the designation C87–100. It is described as a tertiary amine. The following example points out the application of this catalyst.

EXAMPLE IX

| | Parts by weight |
|---|---|
| Magnetic iron oxide | 1620.0 |
| Soya lecithin | 81.0 |
| Silicone oil | 16.2 |
| Solvent | 1054.0 |

Grind above materials in a pebble mill for 72 hours. Then introduce the following and grind for 24 hours.

| | Parts by weight |
|---|---|
| Vitel PE–207 | 213.0 |
| C87–100 | 7.8 |
| Solvent | 668.0 |

Finally, add the isocyanate prepolymer:

| | |
|---|---|
| DV1088–50 | 309.0 |

The preferred method of combining the DV1088–50 with the oxide/Vitel dispersion is to use an automatic proportioning, mixing and dispensing device commonly used for combining two component reactive compositions.

The combined, finely filtered, iron oxide dispersion is coated on polyester film base using a knife coater, reverse roll, or gravure coating techniques.

The wet coating is dried in the previously described oven. The dry coating can now be cured by placing the coated rolls in a warm oven (120°) for 18 hours. This is to be compared to a cure cycle of 150° F. for 48 hours for the uncatalysed coating system.

Test data have been collected on many specific formulations based on the system being discussed. Most of the data are expressed in terms of performance on video recorders, particularly Ampex Recorders known as VR-1000, FR–700 and VR–1500. These are a TV studio recorder, a high performance instrumentation recorder and a low cost, closed circuit TV recorder respectively.

Wear characteristics are obtained by both a loop test and a shuttle test. In this way, wear tests can be made in hours or days instead of weeks that would be required for many of the formulations.

Typical tests have revealed the following:

(1) The tape of the present invention has performed well up to 1200 shuttle passes on the VR–1000 recorder. Thermoplastic tape invariably fails at about 100 passes.

(2) It has withstood 120 passes on the VR–1500. Competitive tape is badly degraded at 70–80 passes.

(3) It has withstood the very high operating temperature of the FR–700. In one case, the system functioned at 130° C. Competitive video tape failed at 105° C. Thermoplastic video tape failed at 85° C.

What is claimed is:

1. The process of making a magnetic recording medium comprising dispersing finely divided magnetic particles in a mixture of a polyester resin having a molecular weight of at least 10,000, a diphenylmethane diisocyanate polyurethane prepolymer having a molecular weight of from about 1100 to about 5000 and a solvent wherein the mixture contains, on a resin solids basis, from about 25% to 75% by weight of the polyester resin and from about 25% to 75% by weight of the prepolymer, coating an organic plastic tape base with said dispersion, heating the coated tape to drive off the solvent, reeling the tape and curing the same to render the coating thermoset.

2. The process of claim 1 wherein the magnetic particles are first dispersed in the polyester and the prepolymer is added to the dispersion.

3. The process of claim 1 wherein the magnetic particles are dispersed in the prepolymer under anhydrous conditions and the polyester is added to the dispersion thus formed.

4. The process of claim 1 wherein the magnetic particles are dispersed in a diisocyanate selected from the group consisting of toluene diisocyanate and diphenylmethane diisocyanate, the polyurethane prepolymer added thereto and dispersed and then the polyester resin is added thereto and dispersed.

5. The process of claim 1 wherein the tape is cured at room temperature for about a week.

6. The process of claim 1 wherein the tape is cured at about 140° F. to 150° F. for about a week.

References Cited

UNITED STATES PATENTS

| | | | |
|---|---|---|---|
| 2,978,414 | 4/1961 | Harz et al. | 252—62.5 |
| 3,077,021 | 2/1963 | Brownlow | 25—156 |
| 3,129,200 | 4/1964 | Muller et al. | 260—858 X |
| 3,144,352 | 8/1964 | Talley | 117—138.8 |
| 3,149,995 | 9/1964 | Bauer | 117—66 |
| 3,150,995 | 9/1964 | Bauer | 117—138.8 |
| 3,200,007 | 8/1965 | Flowers | 117—138.8 |
| 3,216,846 | 11/1965 | Hendricx et al. | 117—62 |
| 3,228,881 | 1/1966 | Thomas | 252—62.5 |
| 3,228,882 | 1/1966 | Harle et a. | 252—62.5 |
| 3,242,005 | 1/1966 | Morita et al. | 117—160 |
| 3,247,017 | 4/1966 | Eichler | 117—138.8 |
| 2,929,794 | 3/1960 | Simon | 260—45.4 |
| 2,948,707 | 8/1960 | Benning | 260—77.5 |
| 2,999,851 | 9/1961 | Elmer | 260—75 |

FOREIGN PATENTS

| | | |
|---|---|---|
| 1,147,399 | 4/1963 | Germany. |

WILLIAM D. MARTIN, *Primary Examiner.*

B. D. PIANALTO, *Assistant Examiner.*

U.S. Cl. X.R.

117—138.8, 121, 145, 161, 226, 100; 252—62.54